United States Patent [19]
Passino et al.

[11] 3,901,781
[45] Aug. 26, 1975

[54] PROCESS FOR DEMINERALIZING WATER

[75] Inventors: Roberto Passino; Gianfranco Boari, both of Rome, Italy

[73] Assignee: Consiglio Nationale Delle Ricerche, Rome, Italy

[22] Filed: July 20, 1973

[21] Appl. No.: 381,245

[30] Foreign Application Priority Data
July 26, 1972    Italy................................. 51780/72

[52] U.S. Cl. ............................ 204/180 P; 204/301
[51] Int. Cl............................................. B01d 13/02
[58] Field of Search............. 204/180 P, 180 B, 301

[56] References Cited
UNITED STATES PATENTS
3,063,924    11/1962    Gomella......................... 204/180 P OTHER PUBLICATIONS
Wilson, "Demineralization by Electrodialysis," (1960), TD 433 P7C.2, pp. 230–233.

Dow Chem. Co., "Dowex: Ion Exchange", 1958, pp. 23, 52 and 54.

*Primary Examiner*—Howard S. Williams
*Assistant Examiner*—A. C. Prescott
*Attorney, Agent, or Firm*—Newton, Hopkins & Ormsby

[57] ABSTRACT

A process for demineralizing water comprising the combination of a pre-treatment of the water and an electrodialysis process for demineralizing said pre-treated water, said pre-treatment comprising an ion exchange treatment using exchange resins of cationic type to replace in the water to be fed to the electrodialysis device, the hard cations with $H^+$ ions and $Na^+$ ions, either separately or together, according to the water characteristics, in particular using $H^+$ ions to neutralize the $HCO_3^-$ ions, said pre-treatment also comprising a regeneration of the exhausted ion exchange resins.

6 Claims, No Drawings

PROCESS FOR DEMINERALIZING WATER

In a prior U.S. Pat. No. 3,637,480 of the same inventors it is shown that in water demineralization by electrodialysis some ionic species are eliminated through permselective membranes while an electric field is applied.

It is also known that in an electro-dialysis process actual energy requirement is higher (say from 10 to 20 times) than the minimum theoretical energy, said energy amount being inversely proportional to current efficiency and directly proportional to the demineralization factor, unit resistance and current density. 1. Current efficiency, understood as a ratio between theoretical current intensity as given by Faraday's Law and actual intensity, is affected by the following factors:

a. shortcircuit losses caused by cell connections;
b. transport losses (co-ion transport, natural osmosis, salt back diffusion);
c. losses due to transfer of $H^+$ and $OH^-$ ions from water dissociation.

In actual plants current efficiency is higher than 90 percent. 2. Concentration polarization is due to the difference between membrane and solution transport (or transference) numbers of ionic species, having the effect of augmenting ions in one side of the membrane and diminishing them on the other side of said membrane. The higher is this difference in transport numbers, the higher is the concentration gradient across the membrane and in the film adjacent it, and, therefore the current density required.

Additionally, concentration polarization can also cause a further resistance increase, due to the presence in a layer adjacent the membrane of some ions in high concentration from which can result insoluble salt precipitation and a formation of thin gaseous layers adhering to the membrane, such salts and thin gaseous layers (as for instance, $CO_2$ evolution from $H^+$ ion accumulation) having an extremely high localized resistance, which gives rise to the so called ohmic polarization.

Such undesired phenomena are enhanced by local overheatings due to the Joule effect as a result of precipitation formations which, to some extent, can be lowered to a certain limit by increasing the turbulence in the solution contacting the membranes, or by an addition of an acid in order to decrease the alkalinity thereof. 3. Plant capacity is directly bound to current density, the practical value of which is however kept at about 80 percent of the limiting current density so as not to increase excessively the above mentioned polarization phenomena.

Current density increases concurrently with an increase of the applied electrode potential differences up to a certain value following which it remains substantially constant while considerably raising the applied voltage. This current density value is the abovementioned limiting current density.

The present invention provides a pre-treatment system for the feed water to an electro-dialysis demineralization plant, where said water has a suitable alkalinity contents, said pre-treatment changing the composition of the materials dissolved therein, allowing:

to reduce concentration and ohmic polarization resistances;
to avoid scale formed by salt deposits from the feed water;
to remove from the feed water colloidal substances which would otherwise precipitate on the membranes;
to raise the density of actual current, increasing the amount of product and decreasing the specific energy and chemical reactant requirements; and
to use sulphuric acid also at high concentration, instead of hydrochloric acid, thus enabling an additional economy to be attained.

The pre-treatment according to the present invention consists in an ion exchange treatment carried out by using ion exchange resins of a cation type to replace in the water to be fed to an electrodialysis process, the hard cations with $H^+$ and $Na^+$ ions, separately or together, using $H^+$ to neutralize the $HCO_3^-$ ions, and in subsequent eventual removing of the formed $CO_2$ by a degassing step, according to the following reactions:

$$2R.Na + Ca^{++} \rightarrow R_2.Ca + 2Na^+$$
$$2R.H + Ca^{++} \rightarrow R_2.Ca + 2H^+$$
$$2H^+ + 2HCO_3^- \rightarrow 2H_2O + 2CO_2$$

Depending upon hardness/alkalinity ratio, the resins are then regenerated in the R.Na form at the expense of sodium chloride of the concentrated brine effluent from the electrodialysis plant, and which is caused to pass through the cationic exchange resin bed, or in the R.H form at the expense of an amount of acid conveyed through said bed, said amount being lower than that heretofore used in electrodialysis plants without feed water pre-treatment.

In fact using the known electrodialysis plants: 1. it is necessary to neutralize both the amount of $HCO_3^-$ ions being transferred from dilute to concentrate stream and the amount of $HCO_3^-$ ions contained in the make-up to the concentrate circuit. 2. The amount of acid to be added is higher than the stoichiometric amount in order to provide on concentrate side a sufficiently high concentration of $H^+$ ions, so that the acid can readily diffuse and neutralize the $OH^-$ as soon as this passes through the anionic membrane.

Temporary hardness could be removed in an acid regenerated weak cation exchange resin. The hardness exceeding the alkalinity, if present, may be eliminated by a sodium regenerated strong cation exchange resin.

By the passage of the feed water on the cationic resin in R.Na form, a partial demineralization of said supply water is obtained through removal of $HCO_3^-$ ions and $Ca^{++}$ and $Mg^{++}$ ions bonded thereto, thus relieving the load on the subsequent electro-dialysis unit.

With the removal of temporary hardness and subsequent replacement of a portion of the eventual hardness in excess on the alkalinity by $Na^+$ ions, because of the following reasons a reduction for the unit resistance is obtained:

a. $Na^+$ ions have a higher mobility than $Ca^{++}$ ions in the solution and possess a higher transport number in the membranes;
b. the removal of $HCO_3^-$ ions reduces the concentration polarization on the anionic membrane; and
c. as a result of the combined effect of the whole or partial removal of $HCO_3^-$ and hardness ions, scaling in the concentrate stream is avoided.

The low total transport number (i.e., the fraction of the total current carried by an ionic species) for $HCO_3^-$ ions, compared with that for the other anions, is shown by the following experimental results, related in the table, in which in the first line is indicated the desalinisation factor (to be intended as the ratio between the removed salts and those present) and in the second line is indicated the corresponding value of the percent ratio of $HCO_3^-$ ions on total anions in the product:

| 0.0 | 0.287 | 0.634 | 0.719 | 0.877 |
|-----|-------|-------|-------|-------|
| 18.0 | 22.1 | 26.5 | 33 | 37.7 |

Additionally, the pre-treatment according to the present invention allows utilization of higher current densities with a resulting larger production of water and lower consumption of energy: this because of the above resistance reduction and resulting reduction in the applied voltage.

We claim:

1. A process for demineralizing water comprising the combination of a pre-treatment of the water and an electrodialysis process for demineralizing said pre-treated water, said pre-treatment comprising an ion exchange treatment using exchange resins of cationic type to replace in the water to be fed to the electrodialysis device, the hard cations with $H^+$ ions and $Na^+$ ions, using $H^+$ ions to neutralize the $HCO_3^-$ ions, said pre-treatment also comprising a regeneration of the exhausted ion exchange resins.

2. A process according to claim 1, wherein the ion exchange treatment provides to use cation exchange resins in R.Na form to partially replace cations in the water with other cations of higher transport number.

3. A process according to claim 1, wherein said cation resins are partially regenerated in the R.Na form by passing brine exhausted from a demineralization plant through the bed of exhausted resins.

4. A process according to claim 3, wherein the brine is that which is exhausted from the electro-dialysis plant.

5. A process according to claim 1, wherein the cation exchange resins are at least partially regenerated in the R.H form by passing an acid, as the sulphuric acid, through the bed of the exhausted exchange resins.

6. A process for demineralizing water which comprises the steps of:
   a. subjecting feed water containing hard cations and $HCO_3^-$ ions to pretreatment involving degassing by contacting same with ion exchange resins of R.Na and R.H type according to the following reactions:
   $2R.Na + Ca^{++} \rightarrow R_2.CA + 2Na^{++}$
   $2R.H + Ca^{++} \rightarrow R_2.Ca + 2H^+$
   $2H^+ + 2HCO_3^- \rightarrow 2H_2O + 2CO_2$
   b. subjecting pretreated water obtained from step (a) to electrodialysis to recover demineralized water and concentrated salt solution;
   c. regenerating the R.Na type ion exchange resin at least in part with the concentrated salt solution of step (b);
   d. regenerating the R.H type ion exchange resin with an acid.

* * * * *

UNITED STATES PATENT OFFICE
CERTIFICATE OF CORRECTION

Patent No. 3,901,781                     Dated August 26, 1975

Inventor(s) Roberto Passino; Gianfranco Boari

It is certified that error appears in the above-identified patent and that said Letters Patent are hereby corrected as shown below:

[73]   Assignee:   Consiglio Nazionale Delle Ricerche,
                   Rome, Italy

*Signed and Sealed this*

*second* Day of *December 1975*

[SEAL]

Attest:

RUTH C. MASON
*Attesting Officer*

C. MARSHALL DANN
*Commissioner of Patents and Trademarks*